United States Patent [19]

Guillaumon et al.

[11] Patent Number: 4,655,966

[45] Date of Patent: Apr. 7, 1987

[54] PROCESS FOR THE PREPARATION OF AN ANTIMONY OXIDE-DOPED TIN OXIDE PIGMENT WITH IMPROVED ELECTRICAL CONDUCTIVITY PROPERTIES, AND WHITE AND TINTED CONDUCTIVE PAINTS CONTAINING THIS PIGMENT WHICH ARE USEFUL FOR THE REMOVAL OF ELECTROSTATIC CHARGES

[75] Inventors: Jean-Claude Guillaumon, Aygvesvives; Louis J. C. Blet, Corronsac; Francoise M. J. B. Guerard, La Tour du Crieu, all of France

[73] Assignee: Centre National d'Etudes Spatiales et Master Peintures, Paris, France

[21] Appl. No.: 761,506

[22] Filed: Aug. 1, 1985

[30] Foreign Application Priority Data

Aug. 2, 1984 [FR] France .................................. 84 12240

[51] Int. Cl.$^4$ ................................................ H01B 1/06
[52] U.S. Cl. ................................. 252/518; 524/409; 524/410; 524/411
[58] Field of Search ................ 252/518; 524/409, 410, 524/411; 106/288

[56] References Cited

U.S. PATENT DOCUMENTS

| | | | |
|---|---|---|---|
| 3,502,597 | 3/1970 | Bush | 253/518 |
| 3,923,698 | 12/1975 | Kamigaito et al. | 252/518 |
| 4,113,507 | 9/1978 | McHenry et al. | 252/518 |
| 4,246,143 | 1/1981 | Sonoda et al. | 252/518 |
| 4,373,013 | 2/1983 | Yoshizumi | 252/518 |
| 4,397,915 | 8/1983 | Wahlers et al. | 252/518 |
| 4,431,764 | 2/1984 | Yoshizuma | 524/410 |

*Primary Examiner*—Josephine L. Barr
*Attorney, Agent, or Firm*—A. W. Breiner

[57] ABSTRACT

The invention relates to a process for the preparation of an antimony oxide-doped tin oxide pigment with a white or off-white color and a surface electrical resistance not exceeding 20 ohms/square, comprising the intimate mixing of tin oxide and antimony oxide, then heating the resultant mixture to a high temperature, in which a proportion of 1.25 to 10 parts by weight of antimony oxide $Sb_2O_3$ per 100 parts by weight of tin oxide $SnO_2$ is mixed and the mixture of $Sb_2O_3$ and of $SnO_2$ is calcined at a temperature in the range from 900° to 950° C.

Application for the manufacture of electrically conductive white or colored paints which are useful particularly in aeronautics.

5 Claims, No Drawings

PROCESS FOR THE PREPARATION OF AN ANTIMONY OXIDE-DOPED TIN OXIDE PIGMENT WITH IMPROVED ELECTRICAL CONDUCTIVITY PROPERTIES, AND WHITE AND TINTED CONDUCTIVE PAINTS CONTAINING THIS PIGMENT WHICH ARE USEFUL FOR THE REMOVAL OF ELECTROSTATIC CHARGES

The invention relates to a process for the preparation of an antimony oxide-doped tin oxide pigment with improved electrical conductivity properties, and white and tinted conductive paints containing this pigment which are useful for the removal of electrostatic charges.

The increasing use of composite materials (epoxides/carbon fibers, carbon/carbon fibers, epoxy/glass fibers, epoxy/aramide fibers, and the like) for the manufacture of airplane structures results in an accumulation of electrostatic charges on the surface of the airplane because of the high electrical resistance of these composites.

This accumulation of electrical charges, particularly through the triboelectric effect of aerosols, causes discharges which interfere with the good operation of radio communication and radio navigation systems and which can, in some cases, even cause the total loss of radio transmission between the airplane and the ground (radio compass in particular).

In order that the electrical charges may be removed correctly and in order that they do not interfere with the radio links, the surface electrical resistance of the airplane must be between 1 and 100 M$\Omega$/square.

Existing finishing paints (generally white) cannot ensure that the electrical charges flow away, because they have a very high surface electrical resistance (greater than $10^{11}\Omega$/square).

These finishing paints are required to ensure a protection of the airplanes against the natural environment (rain, sunlight, etc.) or accidental environment (fuel and oil splashes, and the like).

The solutions which are known at present for removing electrostatic charges consist in:
- either metalizing of the electrically insulating surfaces (metal lattice, conductive adhesive tapes, and the like) followed by the application of an insulating finishing paint of well-determined thickness,
- or the application of a conductive black paint which is stabilized by an oven cure, followed by the application of an insulating finishing paint, of well-determined thickness.

These two solutions have two major disadvantages:
- difficulty of implementation and high cost
- time-consuming and difficult repair, because it requires a complete stripping of the coating in order not to produce an excessive thickness of the insulating finishing layer, which would unavoidably result in breakdowns.

It would therefore be advantageous to have available an electrically conductive finishing paint which could be applied in one or more coats onto the insulating parts of the airplane and whose thickness tolerances would not be critical.

However, in order to be able to prepare an electrically conductive finishing paint meeting the above conditions of surface electrical resistance, it is necessary to have available a pigment which itself has a low surface electrical resistance, that is to say not exceeding approximately 20$\Omega$/square, because otherwise, after mixing with a binder and the other possible components of the paint, paints with inadequate electrical conductivity are obtained.

Furthermore, the pigment should advantageously have a satisfactory color, that is to say be as white as possible, because the major part of the requirements of the aeronautical industry relates to white paints.

The Applicant Companies have now found a new process for the preparation of an off-white pigment having a surface electrical resistance which does not exceed approximately 20 ohms/square, which is suitable for the preparation of white or colored finishing paints with a surface electrical resistance of between 1 and 100 M$\Omega$/square and which can be applied as a single coat directly onto the insulating parts of an airplane.

More particularly, the invention relates to a process for the preparation of an antimony oxide-doped tin oxide pigment with a white or off-white color and a surface electrical resistance not exceeding 20 ohms/square, comprising the intimate mixing of tin oxide and antimony oxide and then heating the resultant mixture to a high temperature, wherein a proportion of 1.25 to 10 parts by weight of antimony oxide $Sb_2O_3$ per 100 parts by weight of tin oxide $SnO_2$ is mixed and wherein the mixture of $Sb_2O_3$ and of $SnO_2$ is calcined at a temperature in the range from 900° to 950° C. Preferably, the proportion of $Sb_2O_3$ ranges from 2.5 to 5 parts by weight per 100 parts of $SnO_2$.

It should be recalled that the concept of surface electrical resistance arises from the observation that $$R = P\frac{L}{el}$$

where
R = resistance in ohms,
P = resistivity of the material,
L = length,
l = width, and
e = thickness.

In the case where L = l, any square with a constant thickness will have the same resistance.

In the process of the invention, the mixture of $Sb_2O_3$ and $SnO_2$ is calcined at a temperature in the range from 900° to 950° C.

Below 900° C. the surface electrical resistance obtained is too high, and above 950° C. the tin oxide begins to decompose. The calcination time may range from a few minutes to several hours.

In addition, the invention relates to a white or colored paint comprising at least one pigment, at least one binder and at least one solvent, in which the pigment is a pigment produced by the process of the invention. By way of indication, the pigment will be present in the paint in the form of particles of a size greater than 1 $\mu$m, typically in the range from 5 to 150 $\mu$m, to produce a satisfactory opacity.

The paints of the invention can be applied in one or more coats onto the substrate to be painted by applying paint films of a thickness advantageously between 5 and 250 micrometers, with a surface electrical resistance of between 1 and 100 M$\Omega$/square.

All the surface electrical resistances referring to the doped pigment and indicated in the present description are given for a square thickness of 1 mm, while all the surface electrical resistances referring to the paints of the invention are given for the thickness of the applied paint film (usually 30 to 60 micrometers), because it is the surface electrical resistance of this film which is of importance in practice.

The paints of the invention comprise at least one pigment according to the invention and at least one binder with film-forming properties.

Any binder which is known to be useful for forming paints can be employed. By way of non-restrictive examples, mention may be made of polyurethanes, epoxide resins, acrylic resins, glycerophthalic resins, silicone resins, and the like. The expert will be able to find numerous types of usable binders in the abundant literature published on this subject. At present, the use of polyurethanes is preferred for aeronautical applications.

In addition to the pigment of the invention and the binder, the paints of the invention may comprise an electrically nonconductive white pigment, for example titanium oxide, zinc oxide, zinc orthotitanate, and the like, which is intended to improve the whiteness of the paint and/or an electrically nonconductive colored pigment intended to impart a required coloring to it.

When an electrically nonconductive white pigment and/or an electrically nonconductive colored pigment is, or are, incorporated in the paint of the invention, care should be taken that the weight ratio of the electrically nonconductive pigments to the pigment of the invention does not exceed 1 : 1.

Furthermore, the weight ratio of total pigments to binder would normally be in the range from 1.5 to 4, although these values are not strictly critical.

By way of indication, use may be made, as a solvent, of aromatic hydrocarbons (toluene, xylene, styrene, naphtha, and the like), aliphatic hydrocarbons (white spirit, gasolines, petroleum, and the like), ketones (methyl ethyl ketone, methyl isobutyl ketone, diacetone alcohol, and the like), esters (ethyl acetate, butyl acetate, propyl acetate, ethylene glycol acetate, butylene glycol acetate, and the like), glycol ethers (ethylene glycol, butylene glycol, methylene glycol, propylene glycol, and the like), alcohols (ethanol, propanol, butanol, and the like), terpene hydrocarbons (turpentine oil, and the like) and water. The proportion of solvent will usually be in the range from 0 to 60% by weight relative to the total weight of the paint.

The paints of the invention may obviously also comprise any required adjuvants generally employed in paint formulations, provided, of course, that they do not excessively deteriorate the electrical conductivity properties of the paint film.

Application of the coat of paint of the invention to a substrate can be carried out with a spray gun, a brush or any other known method. The paint of the invention may be applied to substrates of all kinds such as metals or composite materials. When desired or necessary, a primary bonding coat may be applied, or any other primary, for example anticorrosion, coat, before the paint of the invention is applied.

In addition to their use on airplanes in order to avoid the accumulation of static electricity on electrically nonconductive parts, the paints of the invention can be used in the electronics industry, and for the storage of flammable liquids (particularly oil products).

The following nonrestrictive examples are given in order to illustrate the invention.

EXAMPLE 1

This example illustrates the preparation of various antimony oxide-doped tin oxide pigments by using various proportions of antimony oxide and various temperature and time conditions. The results obtained demonstrate clearly the critical nature of the proportion of $Sb_2O_3$ and of the operating conditions specified above. The following table summarizes the compositions tested, the operating conditions employed and the resultant pigment properties. Surface electrical resistance was measured between two square copper electrodes 1 mm apart, the pigment powder being compressed between these two electrodes. The voltage between the electrodes was 1 volt.

The pigments were prepared by intimately mixing tin oxide and antimony oxide with a particle size of between 20 and 150 μm, in the required proportions, for approximately 10 minutes in a powder mixer, and then heating the resultant mixture in an oven up to the calcination temperature shown, in a continuous manner.

| Pigment | g of $Sb_2O_3$ per 100 g of $SnO_2$ | Calcination temperature °C. | time, h | Surface resistance Ω/square | Color |
| --- | --- | --- | --- | --- | --- |
| A* | 0.625 | 950 | 16 | 100 | gray |
| B | 1.25 | 950 | 16 | 12 | grayish-white |
| C | 2.5 | 950 | 16 | 9 | yellowish-white |
| D 1 | 5 | 900 | 16 | 9 | yellowish-white |
| D 2 | 5 | 950 | 4 | 10 | yellowish-white |
| D 3 | 5 | 950 | 2 | 10 | yellowish-white |
| D 4 | 5 | 950 | 1 | 8 | yellowish-white |
| D 5 | 5 | 950 | 5 min | 8 | yellowish-white |
| E* | 5 | 800 | 16 | 80 | yellowish |
| F | 10 | 950 | 16 | 20 | white, slightly grayish |
| G* | 20 | 900 | 1 | 500 | gray |
| H* | 33.3 | 950 | 16 | 500 | gray |
| I* | 100 | 950 | 16 | 1000 | gray |
| J* | 5 | 400 | 3 | 9000 | |
| K* | 5 | 500 | 3 | 2500 | |
| L* | 5 | 600 | 3 | 1500 | |
| M* | 5 | 1150 | 3 | 1000 | |

*outside the scope of the invention, given for comparison.

EXAMPLE 2 (comparative)

This example, given for comparison, illustrates the critical nature of the choice of antimony oxide as doping agent. The Applicant Companies have tried various other doping agents without being able to obtain doped pigments exhibiting electrical conductivity properties which were as good as those of the pigments of the invention. The following table summarizes the compositions of the pigments prepared, the operating conditions employed, and the properties of the pigments obtained.

| Pigment | $SnO_2$, g | Doping agent nature | Doping agent quantity, g | Calcination temperature, °C. | Calcination time, h | Surface resistance, ohms/square | Color |
| --- | --- | --- | --- | --- | --- | --- | --- |
| J | 100 | $TeO_2$ | 10 | 950 | 16 | 300 000 | gray |
| K | 100 | $In_2O_3$ | 10 | 800 | 16 | 400 000* | yellow |
| L | 100 | $GeO_2$ | 10 | 950 | 16 | 1 000 000 | white |
| M | 100 | $GeO_2$ | 20 | 1150 | 16 | 40 000 | white |

-continued

| Pigment | $SnO_2$, g | Doping agent nature | Doping agent quantity, g | Calcination temperature, °C. | Calcination time, h | Surface resistance, ohms/square | Color |
| --- | --- | --- | --- | --- | --- | --- | --- |
| N | 100 | $GeO_2$ | 100 | 1150 | 16 | 500 000 | white |
| O | 100 | $TiO_2$ | 10 | 950 | 16 | 400 000 | white |
| P | 100 | $TiO_2$ | 20 | 950 | 16 | 200 000 | white |
| Q | 100 | $TiO_2$ | 40 | 950 | 16 | 800 000 | white |
| R | 100 | $TiO_2$ / $Sb_2O_3$ | 53.2 / 13.3 | 950 | 16 | 2 000 | yellowish-white |
| S | 100 | $TiO_2$ / $Sb_2O_3$ | 75 / 5 | 950 | 16 | 500 | grayish-white |
| T | 100 | $TiO_2$ / $In_2O_3$ | 53.2 / 13.3 | 800 | 16 | 2 000 000 | yellowish |

EXAMPLE 3

This example and those which follow illustrate the preparation of paints from a pigment according to the invention.

An electrically conductive white coating is obtained, whose thickness after drying is between 25 and 40 microns, by applying to an electrically nonconductive substrate a paint prepared by the following operating procedure:

4.3 g of ethylene glycol acetate and 4 g of ethyl acetate are added to 17 g of Desmophen 651 polyurethane binder (sold by Bayer) in a vertical mixer; 62 g of pigment C of Example 1 in powder form are then added to the solution obtained and are dispersed for 10 minutes. After this, 8.4 g of ethylene glycol acetate and 10 g of ethyl acetate are added again, and then the paste produced is milled in a Red Devil ball mill for 1 hour. The composition obtained is separated from the balls by screening. The balls are rinsed with 4.3 g of methyl isobutyl ketone and the product of rinsing is added to the composition with stirring. 13 g of Desmodur N 75 hardener is incorporated in the resultant composition just before the latter is applied.

The P/B ratio is 3.

The surface resistance $R_s$ of the coating obtained is:
$R_s$ = 3 MΩ/square.

The method for preparing the paint compositions in the following examples is similar to that described above, except for the changes indicated in respect of the ingredients used.

EXAMPLE 4

An electrically conductive white coating is obtained whose thickness after drying is between 25 and 40 microns, by applying to an electrically nonconductive substrate a paint of the following composition:

Desmophen 651 polyurethane binder (17 g) and Desmodur N 75 hardener (13 g), which are produced by Bayer pigment : mixture of pigment $D_1$ of Example 1 in powder form (46.5 g) and of titanium dioxide (15.5 g), sold by Merck solvents : mixture of ketones and acetates of Example 3.

The P/B ratio is 3.

The surface resistance of the coating obtained is:
$R_s$ = 17 MΩ/square.

EXAMPLE 5

An electrically conductive white coating is obtained whose thickness after drying is between 25 and 40 microns, by applying to an electrically nonconductive substrate a paint of the following composition:

Desmophen 651 polyurethane binder (17 g) and Desmodur N 75 hardener (13 g), produced by Bayer pigment : mixture of pigment C of Example 1 in powder form (54.25 g) and of titanium dioxide (7.75 g) sold by Merck solvents : mixture of ketones and acetates of Example 3.

The P/B ratio is 3.

The surface resistance of the coating obtained is:
$R_s$ = 4 MΩ/square.

EXAMPLE 6

An electrically conductive white coating is obtained whose thickness after drying is between 25 and 40 microns, by applying to an electrically nonconductive substrate a paint of the following composition:

Desmophen 651 polyurethane binder (27 g) and Desmodur N 75 hardener (13 g), produced by Bayer pigment : mixture of pigment $D_1$ of Example 1 in powder form (46 g) and of titanium dioxide (16 g) sold by Merck solvents : mixture of ketones and acetates of Example 3.

The P/B ratio is 3.

The surface resistance of the coating obtained is:
$R_s$ = 23 MΩ/square.

EXAMPLE 7

An electrically conductive white coating is obtained whose thickness after drying is between 25 and 40 microns, by applying to an electrically nonconductive substrate a paint of the following composition:

Desmophen 651 polyurethane binder (17 g) and Desmodur N 75 hardener (13 g), produced by Bayer pigment : mixture of pigment $D_1$ of Example 1 in powder form (45 g) and of titanium dioxide (17 g) sold by Merck solvents : mixture of ketones and acetates of Example 3.

The P/B ratio is 3.

The surface resistance of the coating obtained is:
$R_s$ = 25 MΩ/square.

EXAMPLE 8

An electrically conductive white coating is obtained whose thickness after drying is between 25 and 40 microns, by applying to an electrically nonconductive substrate a paint of the following composition:

Desmophen 651 polyurethane binder (17 g) and Desmodur N 75 hardener (13 g), produced by Bayer pigment : mixture of pigment C of Example 1 in powder form (44 g) and of titanium dioxide (18 g) sold by Merck solvents : mixture of ketones and acetates of Example 3.

The P/B ratio is 3.

The surface resistance of the coating obtained is:
$R_s$ = 43 MΩ/square.

EXAMPLE 9

An electrically conductive white coating is obtained whose thickness after drying is between 25 and 40 microns, by applying to an electrically nonconductive substrate a paint of the following composition:

Desmophen 651 polyurethane binder (18.5 g) and Desmodur N 75 hardener (14 g), produced by Bayer pigment : mixture of pigment C of Example 1 in powder form (46.5 g) and of titanium dioxide (15.5. g) sold by Merck solvents : mixture of ketones and acetates of Example 3.

The P/B ratio is 2.75.

The surface resistance of the coating is:
$R_s$ = 52 MΩ/square.

EXAMPLE 10

An electrically conductive white coating is obtained whose thickness after drying is 38 micrometers, by applying to an electrically nonconductive substrate a paint of the following composition:

Rhodorsil 10336 silicone binder (42 g) from Rh,cir/o/ ne pigment : pigment $D_1$ of Example 1 (62 g)

solvent : xylene (30 g)

The P/B ratio is 3.

The surface resistance of the coating is:
$R_s$ = 4.5 MΩ/square.

EXAMPLE 11

An electrically conductive white coating is obtained whose thickness after drying is 54 micrometers, by applying to an electrically nonconductive substrate a paint of the following composition:

Araldite GZ 601×75 epoxide binder from Ciba-Geigy (22 g) and Versamid 100 (19.2 g) and Versamid 115 (3.7 g) hardeners produced by Schering pigment : pigment $D_1$ of Example 1 (92 g)

solvents : mixture : xylene (15 g), secondary butanol (15 g), isobutyl acetate (15 g), ethylene glycol acetate (15 g).

The P/B ratio is 3.

The surface resistance of the coating is: $R_s$ = 4 MΩ/square.

EXAMPLE 12

An electrically conductive white coating is obtained whose thickness after drying is 95 micrometers by applying to an electrically nonconductive substrate a paint of the following composition:

Araldite PY 341 epoxide binder from Ciba-Geigy (18 g) and Epilink 360 hardener from Akzo (21 g)

pigment : pigment D1 of Example 1 (86 g)

solvent : water (35 g).

The P/B ratio is 3.

The surface resistance of the coating is: $R_s$ = 3 MΩ/square.

EXAMPLE 13

An electrically conductive yellow coating is obtained whose thickness after drying is 50 micrometers by applying to an electrically nonconductive substrate a paint of the following composition:

Desmophen 651 polyurethane binder (19.5 g) and Desmodur N 75 hardener (14 g), produced by Bayer.

pigment : mixture of powder of pigment D1 of Example 1 (47 g) and of yellow iron oxide (8 g).

solvents : mixture : ethylene glycol acetate (12.7 g) and ethyl acetate (14 g).

The P/B ratio is 2.4.

The surface resistance of the coating is: $R_s$ = 1 MΩ/square.

EXAMPLE 14

An electrically conductive green coating is obtained whose thickness after drying is 50 micrometers by applying to an electrically nonconductive substrate a paint of the following composition:

Desmophen 651 polyurethane binder (18.5 g) and Desmodur N 75 hardener (14 g), produced by Bayer.

pigment mixture of pigment D1 of Example 1 in powder form (47 g) and green chromium oxide (15.5 g)

solvents : mixture : ethylene glycol acetate (12.7 g) and ethyl acetate (14 g).

The P/B ratio is 2.75.

The surface resistance of the coating is: 1 MΩ/square.

EXAMPLE 15

An electrically conductive white coating is obtained whose thickness after drying is 40 micrometers by applying to an electrically nonconductive substrate a paint of the following composition:

Desmophen 651 polyurethane binder (18.5 g) and Desmodur N 75 hardener (14 g), produced by Bayer pigment : pigment D1 of Example 1 (62 g)

solvents : mixture : ethylene glycol acetate (12.7 g) and ethyl acetate (14 g).

The P/B ratio is 2.75.

The surface resistance of the coating is: $R_s$ = 10 MΩ/square.

EXAMPLE 16

An electrically conductive white coating is obtained whose thickness after drying is 60 micrometers by applying to an electrically nonconductive substrate a paint of the following composition:

Desmophen 651 polyurethane binder (18.5 g) and Desmodur N 75 hardener (14 g), produced by Bayer.

pigment : pigment D2 of Example 1 (62 g)

solvents : mixture : ethylene glycol acetate (12.7 g) and ethyl acetate (14 g).

The P/B ratio is 2.75.

The surface resistance of the coating is: $R_s$ = 8 MΩ/square.

EXAMPLE 17

An electrically conductive white coating is obtained whose thickness after drying is 55 micrometers by applying to an electrically nonconductive substrate a paint of the following composition:

Desmophen 651 polyurethane binder (18.5 g) and Desmodur N 75 hardener (14 g), produced by Bayer.

pigment pigment D3 of Example 1 (62 g)

solvents : mixture : ethylene glycol acetate (12.7 g) and ethyl acetate (14 g).

The P/B ratio is 2.75.

The surface resistance of the coating is: $R_s = 9$ M$\Omega$/square.

EXAMPLE 18

An electrically conductive white coating is obtained whose thickness after drying is 48 micrometers by applying to an electrically nonconductive substrate a paint of the following composition:

Desmophen 651 polyurethane binder (18.5 g) and Desmodur N 75 hardener (14 g), produced by Bayer.

pigment : pigment D4 of Example 1 (62 g)

solvents : mixture : ethylene glycol acetate (12.7 g) and ethyl acetate (14 g).

The P/B ratio is 2.75.

The surface resistance of the coating is: $R_s = 9.5$ M$\Omega$/square.

EXAMPLE 19

An electrically conductive white coating is obtained whose thickness after drying is 35 micrometers by applying to an electrically nonconductive substrate a paint of the following composition:

Desmophen 651 polyurethane binder (18.5 g) and Desmodur N 75 hardener (14 g), produced by Bayer.

pigment : pigment D5 of Example 1 (62 g)

solvents : mixture : ethylene glycol acetate (12.7 g) and ethyl acetate (14 g).

The P/B ratio is 2.75.

The surface resistance of the coating is: $R_s = 15$ M$\Omega$/square.

EXAMPLE 20

An electrically conductive white coating is obtained, with various thicknesses after drying, by applying to an electrically nonconductive substrate a paint of the following composition:

Desmophen 651 polyurethane binder (18.5 g) and Desmodur N 75 hardener (14 g), produced by Bayer.

pigment : pigment D1 of Example 1 (62 g)

solvents : mixture : ethylene glycol acetate (12.7 g) and ethyl acetate (14 g).

The P/B ratio is 2.75.

The surface resistances of the coating as a function of the various thicknesses are given in the following table:

| Thickness in $\mu$m | $R_s$ in M$\Omega$/square |
| --- | --- |
| 8 | 15 |
| 15 | 11 |
| 21 | 7.5 |
| 27 | 7 |
| 38 | 4.5 |
| 54 | 4 |

We claim:

1. A process for producing an antimony oxide-doped tin oxide pigment comprising the steps of intimately mixing 1.25 to 10 parts by weight of antimony oxide powder present as $Sb_2O_3$ with 100 parts by weight of tin oxide powder present as $SnO_2$, and thereafter firing the resultant mixture at a temperature in the range of from 900° to 950° C., to provide an oxide-doped tin oxide pigment having a white to off-white color and a surface electrical resistance not exceeding 20 ohms/square.

2. A process as claimed in claim 1, wherein 2.5 to 5 parts of antimony oxide are mixed per 100 parts of tin oxide.

3. A white or colored paint comprising at least one pigment, at least one binder, and at least one solvent wherein said at least one pigment is a pigment produced by the process of claim 1.

4. The paint of claim 3 which additionally contains at least one electrically nonconductive pigment, and wherein the weight ratio of the electrically nonconductive pigment to the pigment of claim 6 does not exceed 1:1.

5. The paint of claim 3 in which the weight ratio of total pigments to the binder is in the range of from 1.5 to 4.

* * * * *

UNITED STATES PATENT AND TRADEMARK OFFICE
CERTIFICATE OF CORRECTION

PATENT NO.  : 4,655,966

DATED       : April 7, 1987

INVENTOR(S) : Jean-Claude Guillaumon et al

It is certified that error appears in the above-identified patent and that said Letters Patent is hereby corrected as shown below:

```
Column 10, claim 1, line 23, "oxide-doped" should
    read -- antimony oxide-doped --; and Column 10, claim 4, line 36, "claim 6" should read
    -- claim 1 --.
```

Signed and Sealed this

Twelfth Day of April, 1988

Attest:

DONALD J. QUIGG

*Attesting Officer*   *Commissioner of Patents and Trademarks*